MOTOR DRIVEN MULTIPLE TIMING SWITCH MECHANISM

Filed Dec. 20, 1962 8 Sheets-Sheet 1

INVENTORS
GEORGE B. SODEN
WILLIAM A. KNECHT
BY ARTHUR W. BENNETT
Mandeville & Schweitzer
ATTORNEYS

MOTOR DRIVEN MULTIPLE TIMING SWITCH MECHANISM

Filed Dec. 20, 1962 8 Sheets-Sheet 2

INVENTORS
GEORGE B. SODEN
WILLIAM A. KNECHT
ARTHUR W. BENNETT

BY

Mandeville & Schweitzer

ATTORNEYS

Jan. 25, 1966 A. W. BENNETT ET AL 3,231,699

MOTOR DRIVEN MULTIPLE TIMING SWITCH MECHANISM

Filed Dec. 20, 1962 8 Sheets-Sheet 3

INVENTORS
GEORGE B. SODEN
WILLIAM A. KNECHT
ARTHUR W. BENNETT

BY

Mandeville & Schweitzer
ATTORNEYS

MOTOR DRIVEN MULTIPLE TIMING SWITCH MECHANISM

Filed Dec. 20, 1962 8 Sheets-Sheet 4

INVENTORS
GEORGE B. SODEN
WILLIAM A. KNECHT
ARTHUR W. BENNETT
BY
Mandeville & Schweitzer
ATTORNEYS

MOTOR DRIVEN MULTIPLE TIMING SWITCH MECHANISM

Filed Dec. 20, 1962 8 Sheets-Sheet 5

INVENTORS
GEORGE B. SODEN
WILLIAM A. KNECHT
ARTHUR W. BENNETT
BY
Mandeville & Schweitzer
ATTORNEYS INVENTORS
GEORGE B. SODEN
WILLIAM A. KNECHT
BY ARTHUR W. BENNETT
Mandeville & Schweitzer
ATTORNEYS INVENTORS
GEORGE B. SODEN
WILLIAM A. KNECHT
BY ARTHUR W. BENNETT
Mandeville & Schweitzer
ATTORNEYS INVENTORS
GEORGE B. SODEN
WILLIAM A. KNECHT
ARTHUR W. BENNETT
BY
Mandeville & Schweitzer
ATTORNEYS United States Patent Office 3,231,699

Patented Jan. 25, 1966

3,231,699

MOTOR DRIVEN MULTIPLE TIMING SWITCH MECHANISM

Arthur W. Bennett, Wolcott, William A. Knecht, New Hartford, and George B. Soden, Wolcott, Conn., assignors to Consolidated Electronics Industries Corp., Waterbury, Conn., a corporation of Delaware Filed Dec. 20, 1962, Ser. No. 246,247
6 Claims. (Cl. 200—92)

The present invention relates to timing mechanisms, and is directed more particularly to a novel and improved controllable mechanism for performing a plurality of timing functions.

As an overall objective, the present invention seeks to provide an electrically driven, chronometrically governed, controllable timing mechanism, in which arrangements are made for providing successive, individually adjustable timing apparatus. Specifically, the mechanism of the invention incorporates a number of novel and advantageous mechanical and structural arrangements, serving to provide a compact, effective, and highly reliable timer mechanism particularly suited for military aircraft utilization.

As one of the important features of the invention, a chronometrically governed, adjustable, dual timer mechanism is provided which is of an elongated, narrow configuration suitable for military aircraft installation, and in which a chronometrically governed drive mechanism is interposed in line between the motor-driven mechanism of the timer and the controllable adjusting means therefor. The arrangement is such that the mechanism, although necessarily of an elongated construction in order to house the numerous mechanisms, may effectively be mounted on an aircraft instrument dashboard, for example, with the chronometrically governed drive unit located as close as practicable to the mounting panel so as to minimize the effects of vibration imparted to the unit through the mounting panel.

A more specific aspect of the invention resides in the provision of novel and improved controllable switching mechanisms, arranged to be actuated by a chronometrically governed motor drive unit to provide timed output functions. More particularly, in the dual timer mechanism to be described in detail herein, novel output switch mechanisms are provided, including in-line clutch assemblies, with printed circuit switch elements forming effective integral parts of the clutches. The arrangement is such as to accommodate particularly high accuracy in the initial calibration of the timer unit and in the commencement of the timing system in the operation of the device. In conjunction with the foregoing, a novel and advantageous arrangement is provided for eliminating backlash from the system so that the timing inaccuracies due to gear teeth clearances and the like are avoided. In this respect, each timer section of the overall mechanism includes at least one antibacklash spring anchored to the mechanism frame and acting at all times in one direction to eliminate all backlash between the movable switch unit of a timer and the movable control knob for setting the timer. In addition, each timing section advantageously includes a helper spring acting on only part of the system, enabling the strength of the principal antibacklash springs to be reduced to avoid excessive impact when parts of the system are returned by the main antibacklash springs after timing operations.

The timing mechanism of the invention further includes specifically novel arrangements for controllably adjusting the setting of the separate timing sections with high precision, including specifically novel counter-indicator arrangements reflecting the adjusted condition in the timing sections. The mechanism also includes specifically novel arrangements for making calibration adjustments of the timing sections during assembly, specifically including a special form of switch element, adjustably mounted on the mechanism frame for cooperation with a rotary, clutch-driven printed circuit element. The adjustable switch element is especially adapted for precision "final" adjustment after complete assembly of the mechanism, to establish a precision "zero" switch position for the rotary printed circuit element.

A further specific aspect of the invention resides in the provision of a novel and improved arrangement for desirably illuminating the counter-indicator section of the mechanism, such that its indication, representing the adjusted condition of the timing sections, may be readily observed. In this respect, the mechanism of the invention includes a novel arrangement of illuminating bulbs with an internally lighted transparent cover plate element, to achieve highly effective indicator lighting meeting rigid military specifications. Additionally, the mechanism of the invention includes a novel and highly simplified arrangement for mounting a plurality of miniaturized illuminating bulbs in desired association with the beforementioned, internally lighted cover.

For a better understanding of the above and other advantageous features of the invention, reference should be made to the following detailed description and to the accompanying drawings, in which.

Figure 1:
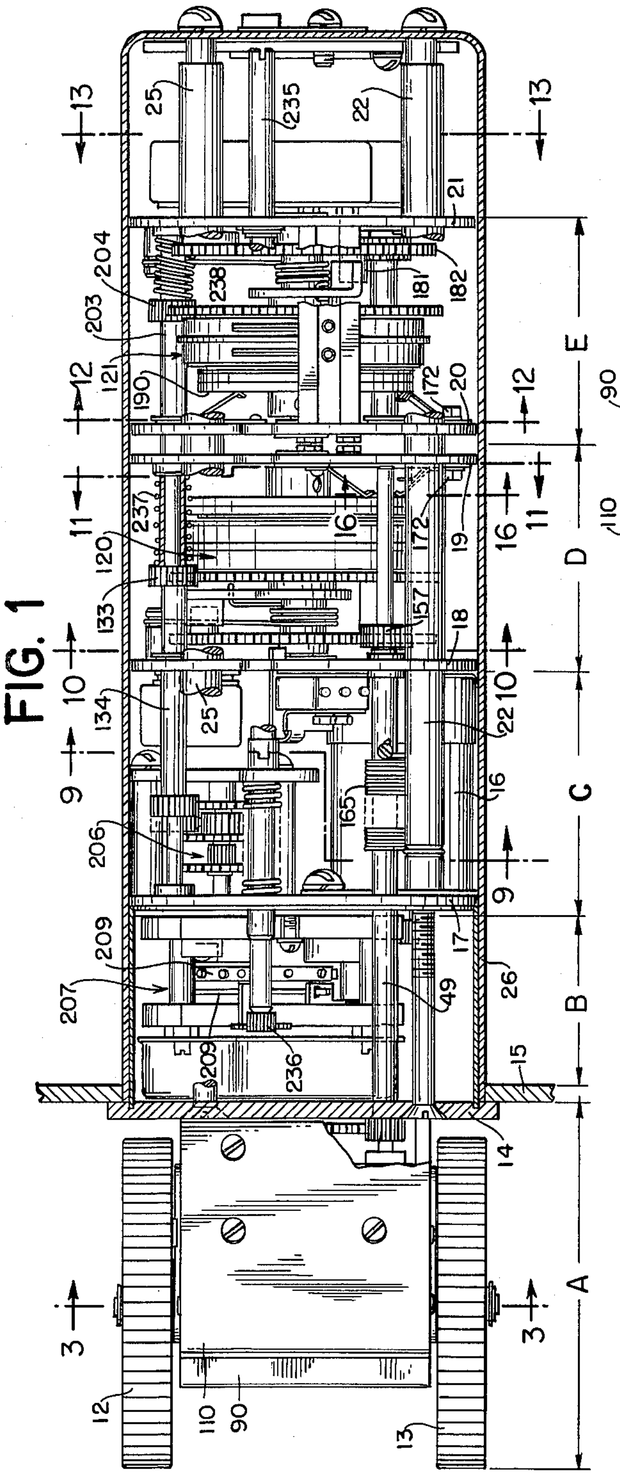
FIG. 1 is a longitudinal, cross-sectional view of a dual timer mechanism incorporating the various features of the invention.
Figure 3:
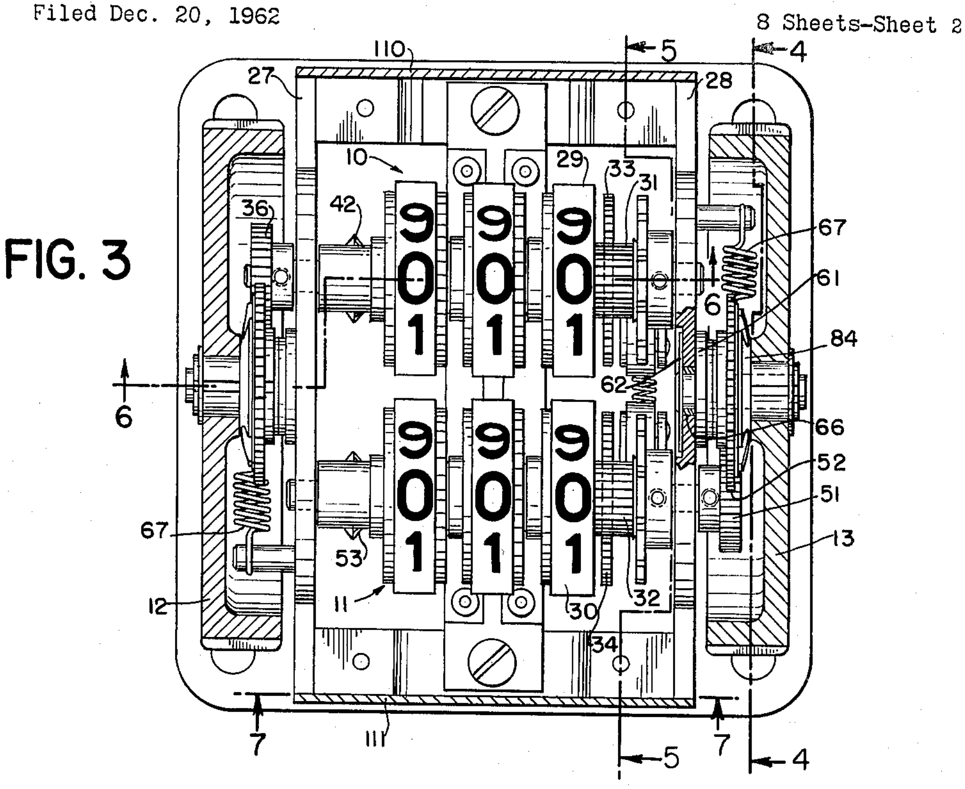
Figure 6:
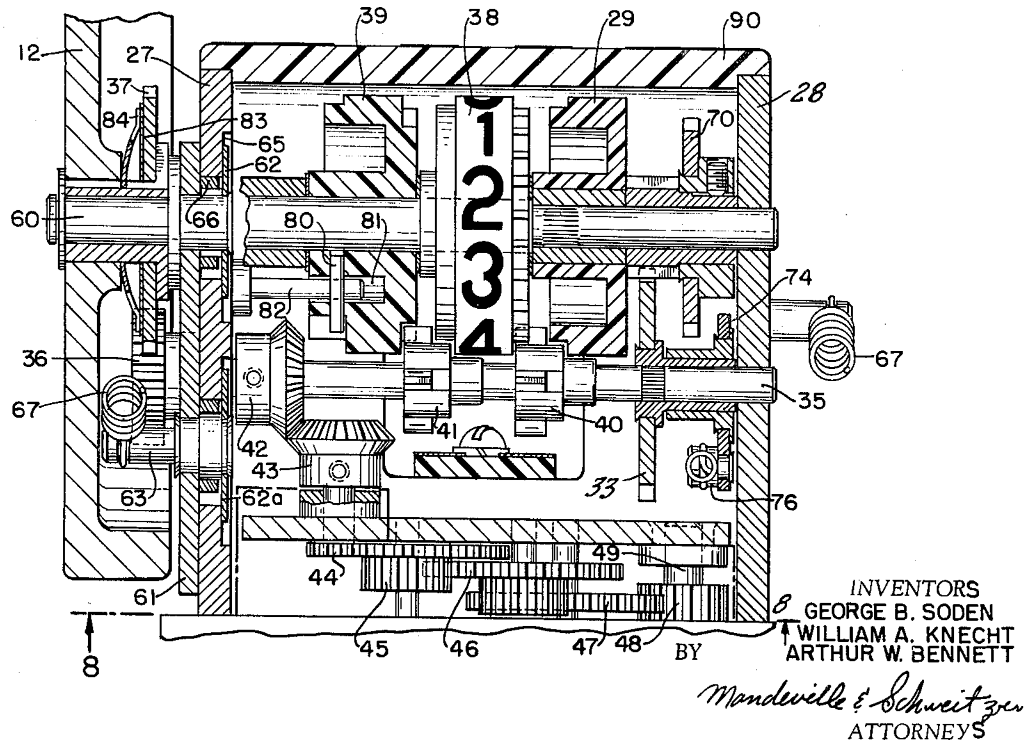
Figure 8:
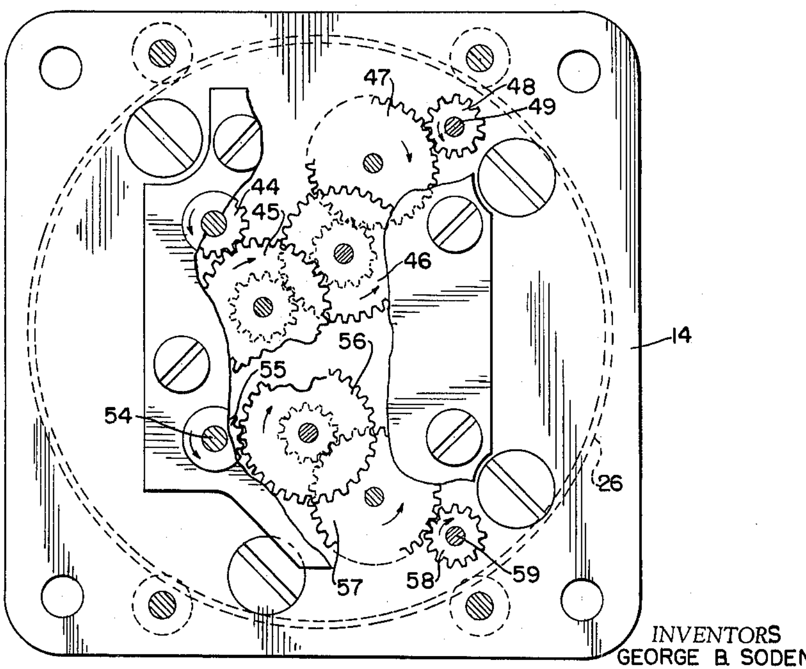
Figure 10:
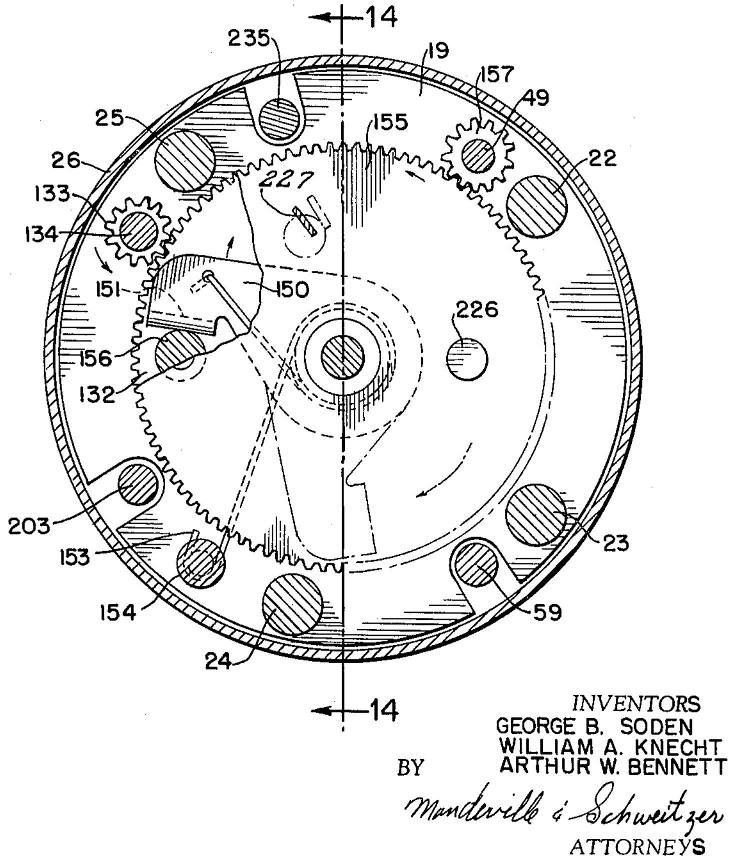
Figures 13, 14, 15, 16, 17:
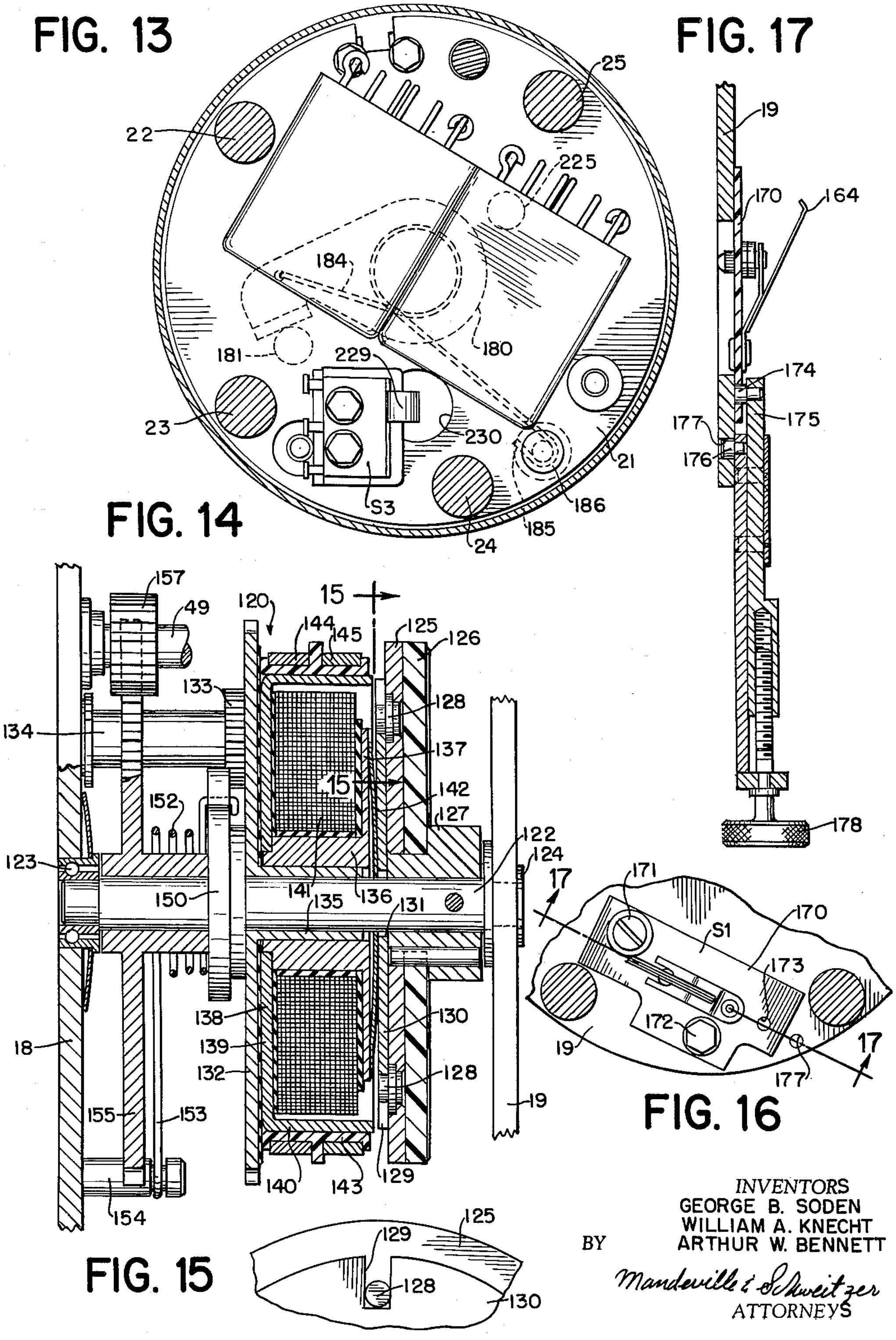
Figure 18:
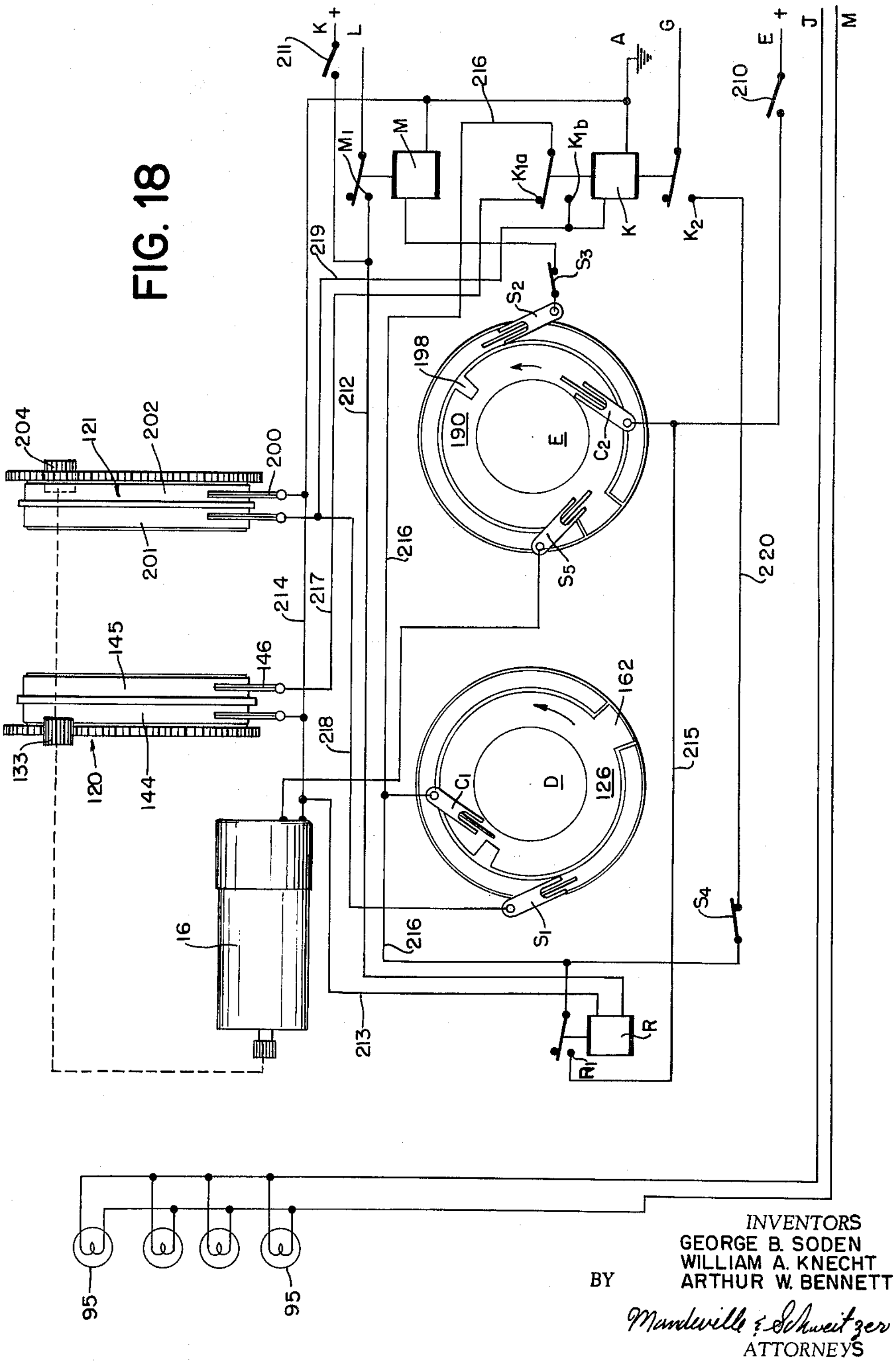

FIG. 3 in an enlarged, transverse, cross-sectional view taken generally along line 3—3 of FIG. 1;

FIGS. 4–7 are cross-sectional views taken generally along lines 4—4 to 7—7 respectively of FIG. 3;

FIG. 8 is a cross-sectional view taken generally along line 8—8 of FIG. 6;

FIGS. 9–13 are transverse cross-sectional views taken generally along lines 9—9 to 13—13 respectively of FIG. 1;

FIG. 14 is a fragmentary, cross-sectional view taken generally along line 14—14 of FIG. 10;

FIG. 15 is an enlarged, fragmentary, cross-sectional view taken generally on line 15—15 of FIG. 14;

FIG. 16 is an enlarged, fragmentary, cross-sectional view taken generally along line 16—16 of FIG. 1;

FIG. 17 is an enlarged, fragmentary, cross-sectional view taken generally on line 17—17 of FIG. 16 including a representation of an extrinsic adjusting tool; and FIG. 18 is a highly simplified schematic representation of the electrical circuitry incorporated in the dual timer mechanism of the invention.

Referring now to the drawings, and initially to FIG. 1 thereof, the letter A designates a control and indicator portion of a dual timer mechanism according to the invention, which portion includes a pair of counter-type indicators generally designated by the reference numerals 10, 11 and a pair of related adjusting knobs 12, 13 associated with the indicators. A second section of the timer mechanism, designated by the letter B in FIG. 1, comprises a chronometric governing section. In accordance with one significant aspect of the invention, the governing section B is disposed immediately adjacent a mounting panel 14, by which the mechanism as a whole is secured to an indicator panel 15, the control portion A of the mechanism being accessible in front of the instrument panel 15 for observation and manipulation. At the rear of the governing section B is a drive section C, which includes an electric drive motor 16 and a related mechanism, cooperating with the governor section, for providing a driven output. Sections D and E of the mechanism, located to the rear of the drive section C, constitute first and second timing sections and include switch arrangements for producing a desired electrical control signal at the end of the predetermined timing period.

Structurally, the mechanism includes, in addition to the front mounting plate 14, a plurality of spaced, transversely disposed deck plates 17–21 secured in fixed relation by a plurality of appropriately located spacer posts 22–25 (see FIGS. 9–13). The basic frame structure, comprising the several deck plates and spacer posts, advantageously is of elongated cylindrical configuration, and is enclosed by a generally cylindrical housing 26. Typically, the mechanism may have a diameter of about 2¼ inches and an overall length of about 9 inches, the portion of the mechanism lying behind the mounting plate 14 being about 7 inches in length.

Referring in detail to the control portion A of the timing mechanism, shown specifically in FIGS. 2–8, the respective indicators 10, 11 are in the form of drum counter devices disposed one above the other in side walls 27, 28 of a control housing. In general, the counters may be conventionally constructed Geneva transfer counters having lower order drums 29, 30, respectively arranged to be rotated in accordance with operations of the control knobs 12, 13. The input to each lower order gear element comprises a pinion 31, 32 driven by an input gear 33, 34. In the case of the upper indicator 10, the input gear 33 is driven by a shaft 35 (FIG. 6) having fixed thereto a gear 36, which is mounted on the outside of the housing wall 27, generally within the interior of the hollow, cup-shaped control knob 12. The gear 36 is arranged for cooperation with a drive gear 37, as will be described in greater detail, such that, when the control knob 12 is properly manipulated, the shaft 35 will be rotated to drive the lower order drum 29 in the desired direction. The higher order drums 38, 39 of the counter are advanced in a well-known manner through Geneva transfer gears 40, 41 loosely journalled on the shaft 35.

The shaft 35 also has fixed thereto a bevel gear 42 mating with a second bevel gear 43. The bevel gear 43 is connected through a reduction train comprising gears 44–47 to a gear 48 fixed to the end of a setting shaft 49 subsequently to be referred to. Thus, the primary function of controlled rotation of the shaft 35, as will hereinafter appear, is to effect controlled rotation of the setting shaft 49 and various timing section elements associated therewith; the secondary function of rotation of the shaft 35 is to set the indicator 10, to reflect precisely the adjusted condition of the setting shaft 49 and its related elements.

The gear 34 for controlling the lower indicator 11 is fixed to a shaft 50 extending out through the housing wall 28 and mounting a gear 51. The gear 51 is arranged to be brought into mech with a gear 52 carried by the right-hand adjusting knob 13. The shaft 50 also has an output connection in the form of a bevel gear 53 meshing with a second bevel gear (not specifically shown) corresponding to the bevel gear 43 associated with the upper indicator 10. The second bevel gear is mounted on a shaft 54 (FIG. 8) which carries a pinion 55. The pinion 55, operating through differential reduction gears 56, 57 drives a gear 58 secured to one end of a second setting shaft 59, such that the rotary position of the setting shaft 59 may be controlled by appropriate manipulation of the knob 13. The setting shafts 49, 59, as will be described in greater detail, are associated respectively with the timing sections D and E, which may be referred to descriptively as "pull-up" and "release" timer sections, and the respective setting knobs 12, 13 may be descriptively referred to as "pull-up" and "release" setting knobs.

Figure 4:
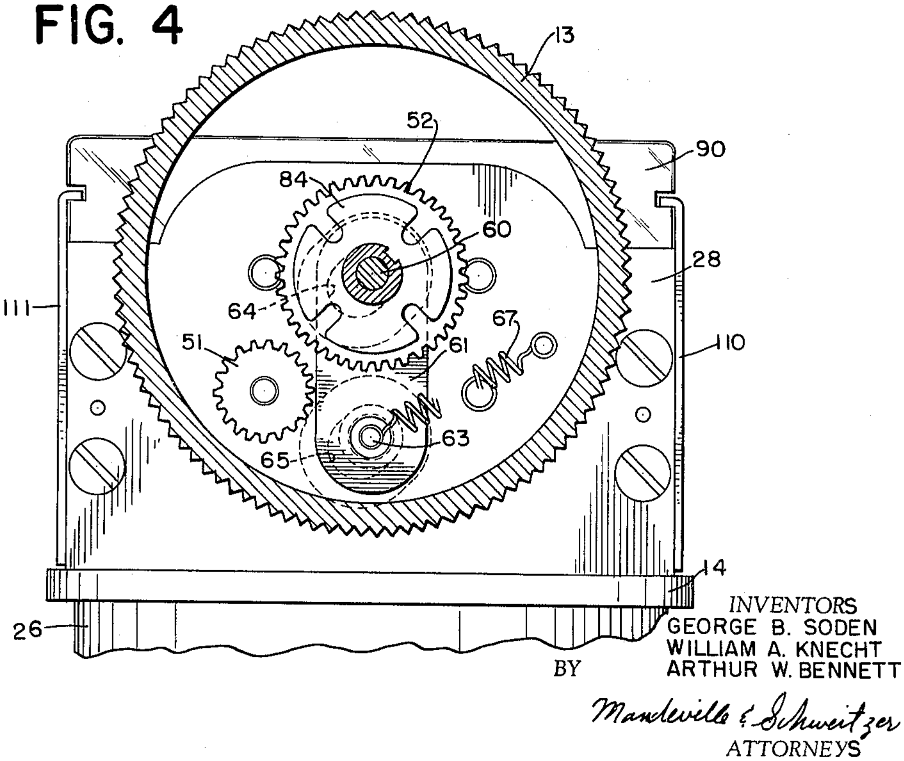

As shown particularly in FIG. 4, the setting knobs 12, 13 advantageously are movably mounted in the respective housing walls 27, 28 to provide for selective engagement and disengagement of the knobs with their respective indicators and setting shafts. Thus, each of the knobs 12, 13, as shown in FIGS. 3, 4 and 6, is mounted on a shaft 60 carried by a slide bar 61. A portion of the shaft 60 extends through the wall 28 and is engaged by a thin washer 62 which holds the shaft in place. The opposite end of the slide bar 61 mounts a spring post 63, which also extends through the housing wall and is engaged by a thin washer *62a*.

The shaft 60 and spring post 63 are received in elongated, diagonally disposed openings 64, 65 in the housing wall, and are movably guided within the openings by bearing elements such as illustrated at 66 in FIGS. 3 and 6. A spring 67 acts upon the spring post 63 in a direction to urge the entire slide bar assembly upward and forward, such that the gear 52 is carried out of mesh with the gear 51, enabling the knob 13 to be turned without effect on the adjustment of the system. The arrangement is such that adjustment requires the conscious effort of the operator, first to press downward and inward on the knob and then to rotate the knob in the desired direction. Accidental dislodgment of a previous setting of the mechanism thereby is substantially avoided.

Figure 5:
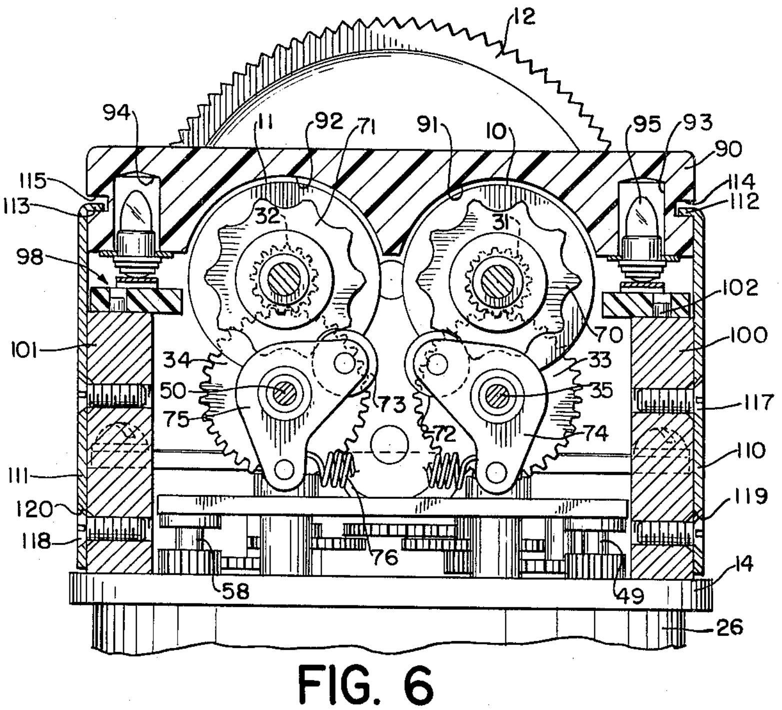

As shown in FIG. 5, each of the indicator units 10, 11 is provided with an aligning detent arrangement including star wheels 70, 71, detent wheels 72, 73, detent levers 74, 75 and a common detent spring 76.

The detent levers 74, 75, which are essentially bell crank levers mounted on the shafts 35, 50 and carrying the detent wheels 72, 73 at one end, are connected between their opposite ends by the common spring 76. The detent star wheels 70, 71 are fixed to the lower order indicator elements 29, 30, such that the indicators are positively aligned, with an indicator numeral properly displayed after any adjustment. The use of the common detent spring 76 is particularly advantageous in that it positively assures that the "feel" of the adjusting detent will be exactly the same for the "pull-up" adjustment as for the "release" adjustment.

To facilitate resetting the indicators to zero and also to prevent operating the indicators forward beyond their maximum positions, the high order element of each indicator is provided with a radial stop pin, as illustrated at 80 in FIG. 6. The stop pin 80 traverses an annular groove 81 in the high order element 39, which groove is arranged to receive an abutment post 82 secured to the housing wall 27. The arrangement is such that when the indicator is operated backward to its "all zero" position, the stop pin 80 engages the abutment bar 82 to prevent further rotation. Continued rotation of the corresponding control knob (knob 12 for the upper indicator 10) is accommodated by a slip clutch arrangement including friction surfaces 83 on the gears 37, 52 and spring clutch elements 84 acting between the control knobs 12, 13 and their respective gears 37, 52. The gears 37, 52 are freely rotatable relative to the knobs 12, 13, but the spring clutch elements 84 are keyed to the knobs, as indicated particularly in FIG. 4. Thus, rotation of the knobs will effect indicator settings and desired mechanism adjustments, until the counters reach an "all zero" position, in the downward direction or a predetermined maximum position in the upward direction, at which time the abutment bars 82 will be engaged by the stop pins. If the maximum setting of an indicator is other than an "all nine" position (as contemplated herein) additional stop pins (not specifically illustrated) are provided in the high order drum elements to limit movement thereof in a forward direction. In the illustrated system, the pull-up indicator 10 has a maximum indication of 60.0 (seconds) and the release has a maximum indication of 30.0 (seconds).

For particularly effective illumination of the counters, with a relatively simplified system arranged reliably to meet strict military specifications, the front cover of the indicator housing is formed of a section 90 of translucent or transparent material (e.g., Lucite) of substantial thickness. An indicated particularly in FIG. 5, the front panel 90 is formed with two deep cylindrical grooves 91, 92 in its rear face, to enable the panel to substantially and closely embrace the frontal areas of the upper and lower indicating drums. In addition, the panel 90 is of sufficient height to have free areas above and below the indicator, which are recessed in the four corner areas, to provide a pair of upper bulb receiving recesses 93 and a similar pair of lower bulb receiving recesses 94.

Advantageously, the entire front panel 90 is covered with an opaque coating material (not specifically shown), except for the deep cylindrical grooves 91, 92, the bulb receiving recesses 93, 94, and limited front areas 96, 97 of appropriate size and shape to permit the calibrated indicating drums to be viewed. The arrangement is such that a plurality of miniaturized incandescent bulbs 95 are inserted in the recesses 93, 94 to provide internal illumination of the panel 90. This specific arrangement has been found to reliably provide a particularly desirable form of illumination of the frontal areas of the indicator drum elements, making the elements readily visible to the operator.

Figure 7:
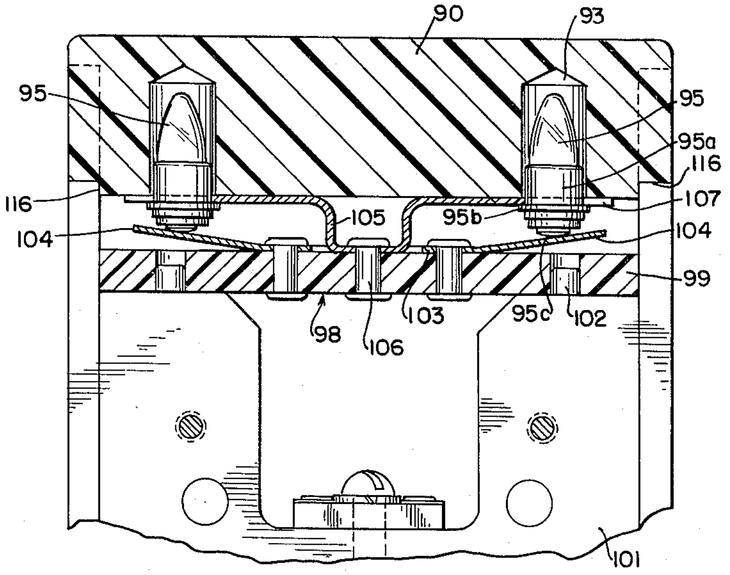

The miniaturized bulbs 95, which are of an available commercial design, advantageously are held in place by special brackets 98 illustrated particularly in FIGS. 5 and 7, located at the top and bottom of the indicator housing. Each mounting bracket 98 comprises a base strip 99 of insulating material, which is located and supported in upper and lower indicator housing walls 100, 101 by means of locating pins 102. Each base strip has secured thereto by rivets a conductive element 103 having spring contact sections 104 extending in opposite directions. A second conductive element 105 is secured to the base strip 99 by a central rivet 106, in insulated relation to the conductive element 103, and is provided with U-shaped contact sections 107 at each end, overlying the spring contact sections 104. The bulbs 95, which are provided with cylindrical base sections *95a* and outwardly extending flanges *95b*, are received in the U-shaped contact sections 107, with the flanges *95b* engaging the bottom surface thereof as shown in FIG. 7. The spring contact sections 104 press upward against contact elements *95c* of the lamps, such that a circuit is completed from one contact section, through the lamp, and to the other contact section. In addition, the lamp is mechanically held in place by the clamping action of the spring elements 104, 107 on the lamp base and the conveying relation of the spring elements.

Advantageously, the transparent front panel element 90 is secured in place on the front of the indicator housing, in light-sealed relation, by means of upper and lower clamping elements 110, 111, which are provided with inwardly directed lip portions 112, 113 at their forward edges. The in-turned lips are received within transverse grooves 114, 115 in the top and bottom edges of the panel 90, substantially as shown in FIG. 5, and the panel 90, which is recessed at 116 along its edges to receive the housing walls 27, 28, is drawn tightly against the housing walls by tightening screws 117, 118 used for securing the clamping elements 110, 111. Thus, the screws 117, 118 are bevel head screws, the heads of which are received in countersunk holes 119, 120 in the clamping plates. However, the countersunk holes 119, 120 are offset in a forward direction from a position of perfect alignment such that, when the screws 117, 118 are drawn tight, the clamping plates 110, 111 are drawn firmly rearward to clamp the front panel 90 tightly against the indicator housing. This arrangement is particularly advantageous in that it avoids passing screws or other fastening elements through the plastic front face 90.

The setting shafts 49, 59 extend longitudinally rearward in the frame structure, in bridging relation to the mechanism of the chronometric governer section B and are operatively connected to the respective timing sections D and E. As a principal component, each of the timing sections D and E includes an adjustable, magnetically clutched switch assembly 120 or 121. To avoid duplication, only the switch mechanism 120 is illustrated in detail (FIGS. 14 and 15) and described specifically, it being understood, however, that the switch mechanism 120 incorporates corresponding parts, unless otherwise specified.

Thus, referring particularly to FIG. 14, a shaft 122 extends axially between the deck plates 18, 19, being journaled therein by antifriction bearings 123, 124 for free rotation. At its rearward end, the shaft 122 mounts a disk assembly comprising an inner disk 125 and an outer printed circuit disk 126, the disks 125, 126 being held in fixed relation to the shaft by bushing 127. The inner disk 125 carries a pair of diametrically opposed driving pins 128, which project forward a short distance and are loosely received in suitable openings 129 in a clutch armature plate 130 formed of magnetic material. The armature plate 130 advantageously is formed with an enlarged central opening 131, so as to be received loosely over the shaft 122, being guided throughout a short axial operating stroke by the pins 128.

Supported on the shaft 122 for rotation with respect thereto is a combined bushing and drive gear element 132, the drive gear meshing with a pinion 133 carried by a motor driven shaft 134, to be described, enabling the gear element 132 to be rotated at a predetermined speed.

Mounted on the bushing portion 135 of the gear and bushing element is a magnetic clutch coil assembly comprising an annulus or core 136 having a radially extending front flange portion 137, and a cuplike housing section 138 forming a magnetic back wall 139 and cylindrical outer wall 140. As shown, a predetermined annular gap is provided between the outer extremity of the flange 137 and the cylindrical wall 140. The elements 136, 138 form an annular housing which receives an electromagnetic clutch coil 141 in properly insulated relation.

As shown in FIG. 14, the armature plate 130 has a diameter approximately equalling that of the cylindrical wall 140 and is limited by the disk 125 to an outer position spaced axially a very short distance away from the cylindrical wall 140 and flange 137, being held lightly in such position by a disklike spring element 142. When the clutch coil is energized, the magnetic flux is caused to concentrate its flow from the radially outer areas of the flange 137, into the radially outer portions of the armature plate 130, and back into the cylindrical wall 140. This is effective to draw the armature plate tightly against the end edges of the cylindrical wall 140, effectively locking the armature plate 130 for rotation with the gear 132 and the clutch coil assembly carried thereby. As will be observed in FIG. 14, the operating stroke of the armature disk 130 is less than the extent of projection of the ends of the pins 128 so that the armature disk remains nonrotatably connected to the disks 125, 126. Thus, although the disks 125, 126 are axially fixed, they are connected for rotation with the clutch coil assembly upon energization of the latter.

For energizing the clutch coil 141, the outer cylindrical wall 140 of the coil housing is provided with an insulating wall 143 which receives annular slip rings 144, 145 connected to opposite ends of the clutch coil 141. The slip rings 144, 145 are arranged to be connected to a source of energizing power through brushes 146 (see FIG. 18) appropriately mounted on the frame structure and engaging the slip rings.

In accordance with the invention, there is fixed to the shaft 122, on the opposite side of the clutch coil assembly from the printed circuit disk 126, a setting arm 150, which has a portion extending radially outward and terminating in a stop tab 151. The setting arm 150 is connected to one end of a coil spring 152 which, in accordance with the invention, has an anchor leg 153 extending radially outward to a clear area of the frame structure and anchored to a fixed part of the frame, as by an anchor pin 154. The spring 152 serves to bias the setting arm 150 to rotate in a predetermined direction (counterclockwise as viewed from the front of the mechanism) away from a predetermined "zero" position.

Cooperating with the setting arm 150 is a setting gear 155, which carries a stop pin 156 (FIG. 10) positioned to engage the stop tab 151 of the setting arm, such that the setting arm 150 is constantly urged by the spring 152 into a position in which the stop tab and stop pin are engaged.

The setting gear 155 meshes with a setting pinion 157 carried by the setting shaft 49 which, as previously described, is controllably rotatable by the setting knob 12. Accordingly, the setting gear 155 may be controllably rotated to any predetermined position within its operating range by appropriate manipulation of the knob 12, being retained in such position by the action of the detent star wheel 70.

Figure 11:
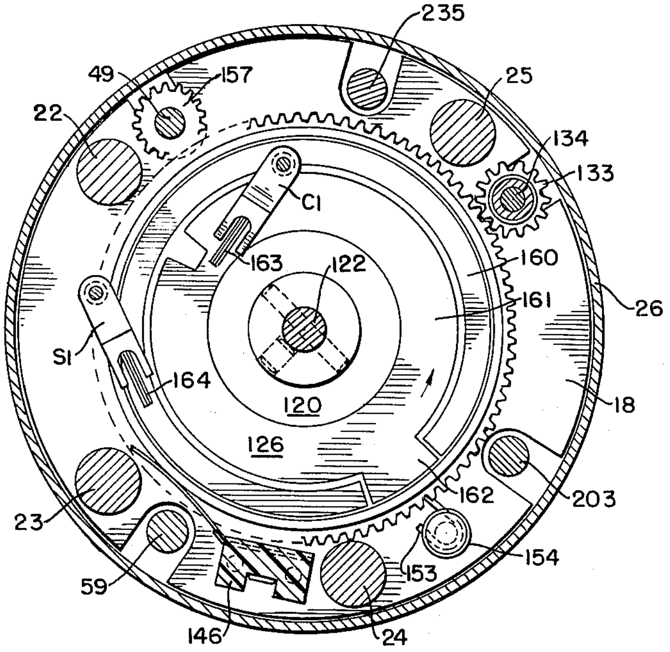

The printed circuit disk 126 operated by the clutch assembly 120 is illustrated in detail in FIG. 11 and is shown to include a discontinuous circular contact portion 160 on its outer periphery and a continuous circular contact portion 161 positioned radially inward of the contact portion 160 and having a tablike portion 162 projecting radially outward into the discontinuity in the outer contact strip 160. A first brush element $C_1$ is mounted on the deck plate 19 and has a spring contact portion 163 slidably contacting the continuous inner contact strip 161. A second contact element $S_1$ is mounted on the deckplate 19 with its spring contact portion 164 aligned with the outer, discontinuous strip 160. The arrangement is such that, when the printed circuit disk 126 is rotated to a predetermined position in which the contact element $S_1$ is engaged by the tablike section 162, a switch circuit is completed by the contact elements $C_1$ and $S_1$. In the illustrated system, the printed circuit disk 126 is rotatable from the position shown in FIG. 11 in a counterclockwise direction, such that a "zero" position is established by passage of the counterclockwise edge of the tab 162 into contact with the spring contact 164 of the contact element $S_1$.

In accordance with the invention, when the rotary position of the setting arm 150 and the printed circuit disk 126 is appropriately adjusted by manipulation of the knob 12, the indicator 10 will indicate all zeros when the disk 126 is in its "zero" position relative to the contact $S_1$. As the knob is manipulated to increasingly higher indicator settings, stop pin 156 will be "backed off" from the tab 151, with the setting arm 150 following the stop pin, however, by virtue of the spring 152. A maximum setting, advantageously determined by a stop pin in the indicator mechanism, prevents the disk 126 from being rotated a full revolution, which is necessary in view of the anchoring of the spring 152 to the frame structure.

With the setting arm 150 and circuit disk 126 set in a preadjusted starting position by the knob 12, the clutch coil 141 may be controllably energized, while rotating, to engage the circuit disk 126 and drive it in a clockwise direction, as viewed from the front of the mechanism. With the clutch coil rotating at a predetermined controlled speed, a predetermined time period will be required to rotate from a preset position to the "zero" position, at which time the circuit function is performed by closure of the "switch" $S_1$. Thereafter, when the clutch coil is deenergized, the setting arm 150 and circuit disk 126 will be returned to their initial positions, against the stop pin 156, by the spring 152.

In accordance with one specific aspect of the invention, backlash in the adjusting system is removed by anchoring the spring 152 to the frame plate, causing the spring to act from the frame all the way back to the detent wheel 70 of the inidcator 10, constantly taking up backlash in one direction. However, since the spring 152 is also utilized to return the setting arm 150 to the stop pin 156 at the end of a timing operation, it is desirable to keep the strength of the spring 152 relatively light. Accordingly, a second, helper spring 165 (FIG. 1) is anchored at one end to the setting shaft 49 and at its other end to the spacer post 22. The helper spring 165 maintains antibacklash bias on all portions of the adjusting system forward thereof, such that the spring 152 need have sufficient strength only to take up backlash in those elements located between the helper spring 165 and the spring 152 and to return the setting arm 150 to its starting position.

To provide highly precise adjustment of the "zero" switch positions, after assembly of the mechanism, the contact element $S_1$ (and a corresponding contact element $S_2$ associated with the second timing section) is adjustably mounted on the deck plate 19. Thus, as shown particularly in FIGS. 16 and 17, the contact element $S_1$ is fixed to an insulated mounting plate 170 which is secured to the deck plate 19 by a screw 171 under a predetermined, limited clamping force and by a bolt 172 accessible from the exterior of the frame structure by a suitable wrench. The mounting plate 170 is provided with a special recess 173, to receive a pin 174 of an extrinsic screw actuated adjusting tool 175 of suitable proportions to be inserted into the mechanism after assembly. A second pin 176 of the adjusting tool is received in a recess 177 in the deck plate 19, as shown particularly in FIG. 17.

After assembly of the mechanism, the indicator 10 is set to an "all zeros" position. Thereafter, the tool may be engaged by the pins 174, 176 with the mounting plate 170 and deck plate 19 respectively, and the screw element 178 manipulated to controllably and precisely advance or retract the mounting plate 170, advantageously in a tangential direction relative to the circuit disk 126, whereby the spring contact element 164 is precisely aligned in contact with the "leading" edge of the circuit tab 162. After such precise adjustment and advantageously before withdrawing the tool 175, the bolt 172 is firmly tightened.

Figure 12:
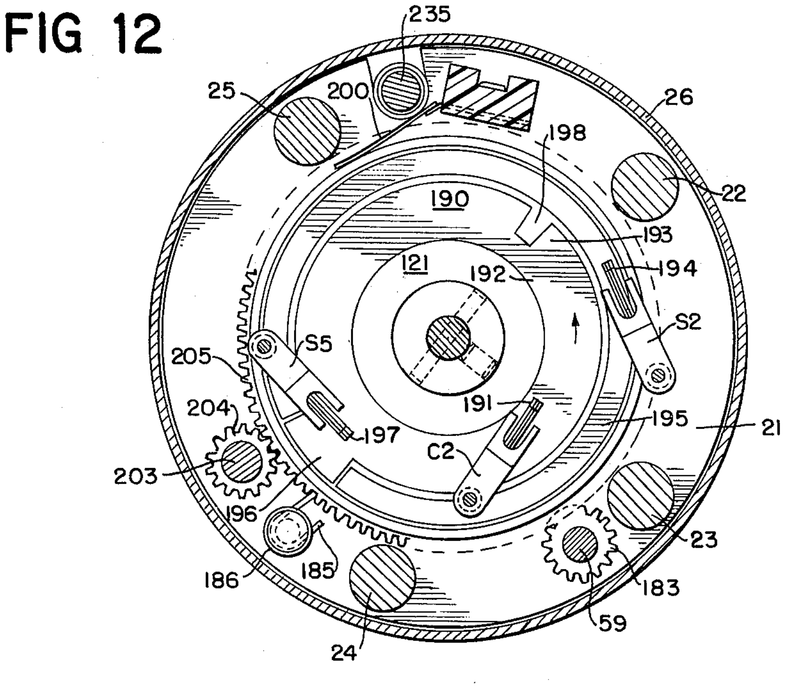

As shown in FIGS. 1, 12, and 13, the mechanism 121 of the second timing section E includes a setting arm 180 cooperating with a stop pin 181 carried by a setting gear 182, the setting gear 182 meshing with a pinion 183 fixed to the setting shaft 59, whereby the rotary position of the gear 182 and stop pin 181 may be controlled by manipulation of the knob 13.

The setting arm 180 is acted upon to rotate in a clockwise direction, as viewed from the front of the mechanism, by spring 184 having one end 185 anchored to a pin 186 on the deck plate 21. The spring 184 urges the setting arm 180 at all times toward the stop pin 181, serving to take up backlash in the control system, all the way back to the star wheel detent 71 for the lower indicator 11. As described in connection with the first timing section D, an anti-backlash helper spring 187 (FIG. 9) is fixed at one end to the setting shaft 59 and anchored at its other end to the spacer post 23, helping to take up backlash forward of the helper spring and permitting the principal spring 184 to be of less effective strength to reduce impact between the setting arm 180 and stop pin 181 after a timing operation.

The magnetic clutch arrangement for the timing section E is similar in pertinent respects to the mechanism of FIG. 14, although reversely oriented, and a printed circuit disk element 190 is positioned to face the deck plate 20 and is connected for rotation with the clutch armature of the unit 121.

The printed circuit disk 190, illustrated in more detail in FIG. 12, advantageously may be identical to the printed circuit disk 126, but is adapted for modified switching effect. Thus, a common contact element $C_2$ has its spring contact 191 engaging a continuous circular portion 192 of a contact strip 193 to make electrical contact in any rotary position. A second contact element $S_2$, corresponding generally to the contact element $S_1$ of FIG. 11 and mounted for precision adjustment by the tool 175, has its spring contact element 194 aligned with the discontinuous outer circular strip 195, being arranged to make contact with a tablike portion 196 of the conductive strip 193, to complete a circuit between contact elements $C_2$ and $S_2$ when the printed circuit element 190 is in a "zero" rotational position. A third contact element $S_5$ is aligned with discontinuous outer portions of the contact strip 193 and has its spring contact element 197 positioned to engage a discontinuity 198 in the strip portion 193 upon continued counterclockwise rotation of the circuit disk 190 for a short distance after reaching its "zero" position.

The timing clutch unit 121 is energizable through slip contact elements 200, contacting slip rings 201, 202, as described in conjunction with the timing clutch unit 120.

Controlled rotation of the clutch coil is effected by a drive shaft 203 which carries a pinion 204 meshing with a gear 205 forming a part of the clutch coil assembly.

For driving the timing clutch units 120, 121 at precisely controlled speeds, the motor drive shafts 134, 203 are connected through an appropriate gear mechanism generally designated 206 to the D.C. motor unit 16. he speed of the motor unit 16 is controlled by a chronometric governor unit, generally designated 207, which is of the type described and claimed in the Arthur W. Haydon United States Patent No. 2,523,298, granted September 26, 1950. For the details of operation of the chronometric governor, reference should be made to the before-mentioned A. W. Haydon patent. However, it is pertinent to note here that the mechanism includes a balance wheel 208 and hair spring 209, which elements, along with other oscillatory governor elements described in the A. W. Haydon patent, may be adversely affected by severe vibrational forces and motions. The motor 16, which both drives the chronometric governing section and is precisely controlled thereby, drives the output shafts 134, 203 at precisely controlled speeds, such that predetermined rotations of the clutch units by the drive motor 16 are accurately translatable into timed periods.

Figure 2:
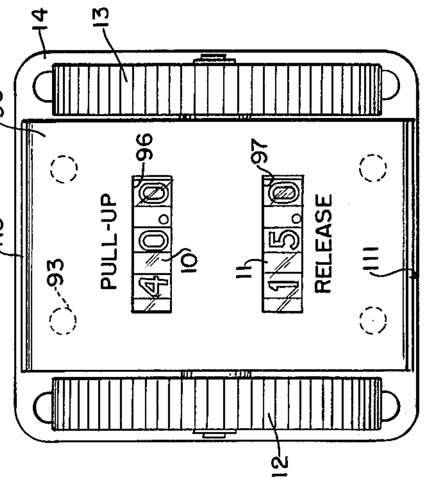
FIG. 2 is a front elevational view of the dual timer mechanism of FIG. 1.

In the operation of the mechanism of the invention, the indicators 10, 11 are preset to desired readings, such as the 40.0 second and 15.0 second readings indicated in FIG. 2, which is effective to rotate the setting arms and printed circuit elements of the respective timing sections D, E to predetermined positions spaced angularly from the "zero" positions, substantially as shown in the schematic illustration of FIG. 18. With the mechanisms properly set, a "make-ready" switch 210 is closed to complete a circuit from a positive terminal E, through the contact elements $C_2$ and the switch contact $S_5$ to the motor 16, the other side of the motor being connected to ground at terminal A. This sets the motor into operation, and a short time interval is allowed to pass while the motor reaches equilibrium at its governed speed, substantially in the manner indicated in the before-mentioned Arthur W. Haydon Patent No. 2,523,298. Operation of the motor 16 sets the clutch coils in the timing sections D and E into rotation at a desired, precisely governed speed.

After a short "make-ready" interval, after closing of the switch 210, a "run" switch 211 is closed to connect a positive terminal K through a conductor 212 to one side of a relay R, the other side of the relay being connected through conductors 213 and 214 to the ground terminal A. This energizes the relay R, closing normally opened contacts $R_1$ and completing a circuit from the positive terminal E and "make-ready" switch 210, through conductors 215, 216, normally closed contacts $K_{1a}$ of a relay K and a conductor 217 to one side of the coil of the clutch unit 120, the other side of the clutch being grounded to the terminal A.

Upon energization of the clutch unit 120, the printed circuit disk 126 is locked to the rotating clutch coil, and the first timing period is commenced. The first timing period is terminated when, after predetermined counterclockwise rotation of the disk 126, the switch contact $S_1$ engages the tablike section 162. Upon closing of the switch $S_1$, the second clutch unit 121 is energized through a circuit including the conductor 216, contacts $C_1$, $S_1$ and a onductor 218. At the same time, an energizing circuit is completed through a onductor 219 to the relay K, causing closure of contacts $K_{1b}$ and $K_2$ and opening of contacts $K_{1a}$. This causes an external circuit function, through a closed switch $S_4$, conductor 220, and switch contacts $K_2$ to terminal G. Simultaneously, clutch unit 120 is deenergized and the clutch unit 121 is energized to commence the second timing period. When the clutch unit 120 deenergizes the disk 126 returns to its starting position, the relay K being self-holding through its now closed contacts $K_{1b}$.

After a predetermined second timing period, according to the setting of the indicator 11, a circuit is closed through the switch contact $S_2$ and a normally closed switch $S_3$ to a relay M, energizing the relay, closing its contacts $M_1$, and performing an external circuit function by connecting the positive terminal K through to a terminal L. Although the two timing functions now are complete, the clutch unit 121 remains energized and continues to rotate the printed circuit element 190 for a few more degrees until the contact $S_5$ engages the discontinuity 198, thereby opening the energizing circuit to the motor 16. Subsequently, when the "run" switch 211 is opened, the relay R is deenergized, opening the energizing circuit to the clutch unit 121 and enabling the disk 190 to return to its preset position.

Figure 9:
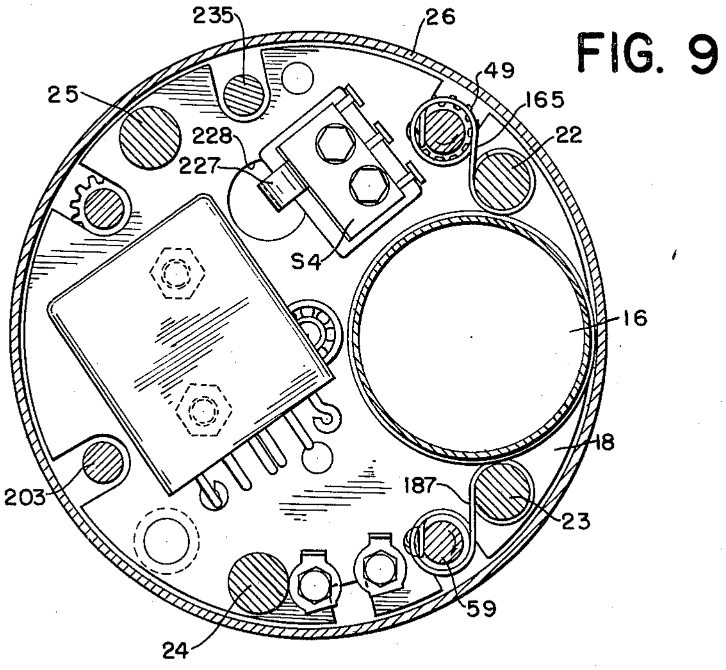

Since the circuit functions performed by applying potential to the terminals L and G occur when the respective printed circuit elements 126, 190 are rotated from their initial positions to "zero" positions, it will be understood that the circuit functions would undesirably be performed upon energization of the timer, if the indicator settings were left at "zero." Thus, in order to avoid performing the external circuit functions in the absence of a definite setting of the control knobs 12, 13, mechanical safety switches $S_3$, $S_4$ have been connected in series with the circuits associated with the external function terminals L and G. The switch $S_3$ (shown in FIG. 13) and the switch $S_4$ (shown in FIG. 9) are positioned to be engaged and depressed by actuator elements 225 (FIG. 13) and 226 (FIG. 10) when the setting gears 182, 155 are rotated to "zero" positions. Thus, as indicated in FIGS. 9 and 10, the switch $S_4$ is secured to the front surface of the deck plate 18 and has an actuating arm 227 projecting through an opening 228 to the opposite side of the deck plate, and actuating element 226, carried by the setting gear 155, is positioned to engage and depress the projecting arm 227, when the gear is moved to a "zero" position. Similarly, the switch $S_3$ (FIG. 13) is mounted on the back surface of the deck plate 21 and has an actuating arm 229 projecting through an opening 230 to the deck plate to be engaged by the element 225 projecting rearwardly from the setting gear 182.

In the event adjustment of the chronometric governor mechanism is required, such adjustment is accommodated by an elongated rod 235, accessible at the back of the unit and having a pinion 236 at its forward end extremity adjustably associated with the chronometer hair spring.

In the structural make-up of the new mechanism, the various elongated shaft elements extending through the mechanism advantageously are journalled and positioned by suitable thrust bearings acting in one direction and springs, such as springs 237, 238 acting in the other direction. The described arrangement provides for the accommodation of substantial lengthwise tolerances as well as lengthwise dimensional changes due to expansion and contraction, etc.

The mechanism of the invention provides a particularly advantageous multiple timing mechanism, adapted especially to the rigid specifications of military aircraft application and characterized by chronometric accuracy. One of the basic principles incorporated in the new timing mechanism resides in the orientation of the basic elements, in an elongated mechanism including a control portion, a governing portion, and a controllable timing portion, in a manner placing the delicate governing mechanism between the control and the controlled portions. The arrangement is such that the sensitive governor mechanism may be mounted as close as possible to the instrument panel, where it is least affected by vibrational movements and forces. By conventional design principles, the motor and governor system would be mounted at the rearward end of the frame structure which, in a mechanism which is necessarily elongated to accommodate multiple timing sections, would render the governing mechanism subject to highly magnified vibrational movements undesirably affecting control accuracy.

The mechanism of the invention further includes specifically novel rotating magnetic clutch units, in which printed circuit disk elements are effectively integrally associated with the clutch armatures, providing especially compact, simplified switch control. Further, the rotatable armature elements are controlled by advantageously arranged setting arms located on the opposite side of the clutch mechanism, enabling the front face of the printed circuit disk to be maintained free of obstructions and to be mounted as close as practicable to fixed deck plates carrying cooperating brush contact elements. Overall, the arrangement is unusually simplified and compact and characterized by ruggedness and accuracy required by military specifications.

A specifically advantageous feature resides in the anti-backlash arrangement associated with each setting mechanism, including a light spring acting directly on the setting arm and back through all of the gears, etc., to springheld control detents. In addition, helper springs are provided acting throughout most of the control system to eliminate backlash, but isolated from the setting arms themselves, so that the return spring force acting upon the setting arms is maintained within desirable limits.

Several features of specific novelty are incorporated in the control and indicating portion of the mechanism, including novel facilities for illuminating the indicator assemblies, as well as specifically novel arrangements for controllably adjusting the timing sections and the corresponding indicators.

It will be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. An adjustable timing switch mechanism comprising (a) elongated frame structure, (b) a constant speed motor, (c) a timing shaft adapted to be rotated about a predetermined axis parallel with the longitudinal axis of said elongated frame structure, (d) bearing means supported by said frame structure and mounting said timing shaft for rotation, (e) printed circuit contact means fixed to said timing shaft for rotation therewith, (f) a magnetic clutch coil adapted to be rotated by said motor and supported freely on said timing shaft, (g) drive means interconnecting said motor and said clutch coil and rotating said coil independently of said timing shaft, (h) a clutch armature element supported on said timing shaft in a fixed radial relation therewith in a predetermined proximately spaced relation with said clutch coil element, (i) said clutch armature element being axially movable into and out of magnetically locked engagement with said clutch coil element, (j) said armature and said timing shaft thereby being rotatable in a predetermined operative direction in unison with said clutch coil upon the energization thereof, (k) disk spring means tending to maintain said predetermined spaced relation between said coil and said armature, (l) spring contact means fixed to said frame structure adjacent said printed circuit contact means in a predetermined reference position determinative of the completion of a pre-selected timing period, (m) mechanical stop means rotatable about said axis and adjustably radially displaceable from said reference position into a selected starting position, (n) setting arm means fixed to said shaft and cooperable with said stop means to limit rotation of said shaft in a direction opposite to said operative direction, (o) resetting spring means urging said setting arm and said shaft into said starting position, (p) first circuit means for energizing said clutch coil, and (q) second circuit means including said printed circuit contact means and said spring contact means for performing a switching function contemporaneously with the termination of a predetermined timing period, as established by the duration of the rotation of said timing shaft from said selected starting position to said reference position.

2. A timing switch mechanism in accordance with claim 1, which includes (a) manually adjustable control means, (b) gear train means interconnecting said control means and said stop means for orienting the latter with respect to said reference position and thereby establishing a timing period.

3. A timing switch mechanism in accordance with claim 2, in which (a) spring means act in opposition to said gear train means to eliminate backlash therein, and (b) said spring means includes said resetting spring.

4. A timing switch mechanism in accordance with claim 1, in which (a) said printed circuit means is axially fixed to said shaft, (b) axially extending guide means maintain said printed circuit means and said armature in a radially fixed relation with respect to said shaft.

5. A timing switch mechanism in accordance with claim 1, in which (a) said clutch coil means is supported by said shaft and is disposed between said setting arm means and said printed circuit contact means.

6. A timing switch mechanism in accordance with claim 1, in which (a) said first circuit means includes a pair of spaced conductive slip rings connected to opposite ends of the clutch coil and brush contact elements mounted on said elongated frame structure cooperatively associated with said slip rings to energize said coil.

References Cited by the Examiner

UNITED STATES PATENTS

| | | | |
|---|---|---|---|
| 991,087 | 5/1911 | Ralph et al. | 200—92 X |
| 1,853,225 | 4/1932 | Rae | 200—92 X |
| 1,982,463 | 11/1934 | Borgerd et al. | 200—30 |
| 2,571,411 | 10/1951 | Blossey et al. | 74—10.15 |
| 2,769,344 | 11/1956 | Block et al. | 74—10.15 |
| 2,861,537 | 11/1958 | Kadlec | 116—129 |
| 2,866,869 | 12/1958 | Sinninger | 200—92 |
| 2,900,949 | 8/1959 | Baker | 116—129 |
| 2,949,512 | 8/1960 | Elliott | 200—35 |
| 3,029,327 | 4/1962 | Volker | 200—92 |
| 3,030,460 | 4/1962 | Huetten et al. | |
| 3,095,485 | 7/1963 | Rowe | 200—35 |

KATHLEEN H. CLAFFY, *Primary Examiner.*

BERNARD A. GILHEANY, ROBERT K. SCHAEFER, *Examiners.*